(12) United States Patent
Takahashi

(10) Patent No.: US 10,070,043 B2
(45) Date of Patent: Sep. 4, 2018

(54) IMAGE PROCESSING SYSTEM, IMAGE PROCESSING METHOD, AND PROGRAM

(71) Applicant: NEC Corporation, Minato-ku, Tokyo (JP)

(72) Inventor: Yusuke Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/419,363

(22) PCT Filed: Jul. 31, 2013

(86) PCT No.: PCT/JP2013/070695
§ 371 (c)(1),
(2) Date: Feb. 3, 2015

(87) PCT Pub. No.: WO2014/027567
PCT Pub. Date: Feb. 20, 2014

(65) Prior Publication Data
US 2015/0229835 A1  Aug. 13, 2015

(30) Foreign Application Priority Data

Aug. 15, 2012 (JP) ................................ 2012-180230

(51) Int. Cl.
*H04N 5/232* (2006.01)
*H04N 5/262* (2006.01)
(Continued)

(52) U.S. Cl.
CPC ..... *H04N 5/23216* (2013.01); *H04N 5/23293* (2013.01); *H04N 5/23296* (2013.01);
(Continued)

(58) Field of Classification Search
CPC ........... H04N 5/23293; H04N 5/23296; H04N 5/23216; H04N 5/2621
See application file for complete search history.

(56) References Cited

U.S. PATENT DOCUMENTS

| | | | |
|---|---|---|---|
| 2005/0001931 A1* | 1/2005 | Kahn | H04N 7/0122 348/556 |
| 2010/0134641 A1* | 6/2010 | Marti | H04N 5/2259 348/222.1 |

(Continued)

FOREIGN PATENT DOCUMENTS

| | | |
|---|---|---|
| JP | H07-046566 A | 2/1995 |
| JP | 2007-166447 A | 6/2007 |

(Continued)

OTHER PUBLICATIONS

International Search Report for PCT Application No. PCT/JP2013/070695, dated Aug. 27, 2013.

(Continued)

*Primary Examiner* — Ahmed A Berhan

(57) ABSTRACT

Provided are an image processing system, an image processing method, and a program capable of improving the user-friendliness upon implementing the operation input for controlling the imaging device. Provided are an image acquisition unit for receiving an image captured by a video camera, a display control unit for displaying the image on a display device, an input control unit for receiving an operation input for changing at least one of an image-capture direction and magnification of the video camera, and a camera control unit for changing at least one of the image-capture direction and magnification of the video camera according to the operation input. During a period after the operation input up to completion of the change in the image-capture direction or magnification by the video camera, the display control unit causes the display device to display an image which is created from a part of the image captured by the video camera, and which is an image of a structural outline corresponding to the image-capture direction or magnification according to the operation input.

8 Claims, 7 Drawing Sheets

(51) Int. Cl.
*G06F 3/0488* (2013.01)
*G06F 3/01* (2006.01)
(52) U.S. Cl.
CPC .......... *H04N 5/2621* (2013.01); *G06F 3/017* (2013.01); *G06F 3/0488* (2013.01)

(56) References Cited

U.S. PATENT DOCUMENTS

2010/0157105 A1* 6/2010 Yokohata ............... G02B 7/102
348/240.3
2012/0169871 A1* 7/2012 Sablak .................... H04N 7/18
348/143

FOREIGN PATENT DOCUMENTS

| JP | 2009-284452 A | 12/2009 |
| JP | 2011-166497 A | 8/2011 |
| JP | 2011-205345 A | 10/2011 |

OTHER PUBLICATIONS

Japanese Office Action for JP Application No. 2014-530512 dated Sep. 5, 2017 with English Translation.

\* cited by examiner

IMAGE PROCESSING SYSTEM, IMAGE PROCESSING METHOD, AND PROGRAM

CROSS-REFERENCES

This application is a National Stage Entry of PCT/JP2013/070695 filed on Jul. 31, 2013, which claims priority from Japanese Patent Application 2012-180230 filed on Aug. 15, 2012, the contents of all of which are incorporated herein by reference, in their entirety.

BACKGROUND

Modes according to the present invention relate to an image processing system, an image processing method, and a program.

In recent years, an imaging device (camera) having, for example, a pan (rotation) function, a tilt (angle adjustment) function, and a zoom (expansion/reduction) function (collectively referred to as the pan-tilt zoom function, or the PTZ function) is becoming popular. Moreover, various methods for operating this kind of imaging device are also being considered. For example, Patent Publication JP-A-H7-46566 discloses a method of controlling the camera by a user designating the positions (x, y) on the image-capture screen.

Here, since the change in the image-capture direction or magnification of the imaging device requires a mechanical movement, a given period of time is required until the control pertaining to such change is completed. Nevertheless, the method described in Patent Publication JP-A-H7-46566 fails to give consideration to this point. Therefore when the user continues performing the operation input, the user needs to imagine the image (structural outline) when the control is completed.

SUMMARY

The several modes of the present invention were devised in view of the foregoing problems, and one object of this invention is to provide an image processing system, an image processing method, and a program capable of improving the user-friendliness upon making the operation input for controlling the imaging device.

The image processing system according to the present invention is an image processing system including: reception means for receiving an image captured by an imaging device; display control means for displaying, on a display device, the image received from the imaging device; input means for receiving an operation input for changing at least one of an image-capture direction and magnification of the imaging device; and camera control means for changing at least one of the image-capture direction and magnification of the imaging device according to the operation input, wherein, during a period after the operation input up to completion of the change in the image-capture direction or magnification by the imaging device, the display control means causes the display device to display an image which is created from a part of the image captured by the imaging device, and which is an image of a structural outline corresponding to the image-capture direction or magnification according to the operation input.

The image processing method according to the present invention is an image processing method in which an image processing system performs the steps of: receiving an image captured by an imaging device; displaying, on a display device, the image received from the imaging device; receiving an operation input for changing at least one of an image-capture direction and magnification of the imaging device; changing at least one of the image-capture direction and magnification of the imaging device according to the operation input; and causing, during a period after the operation input up to completion of the change in the image-capture direction or magnification by the imaging device, the display device to display an image which is created from a part of the image captured by the imaging device, and which is an image of a structural outline corresponding to the image-capture direction or magnification according to the operation input.

The program according to the present invention is a program for causing a computer to perform: processing of receiving an image captured by an imaging device; processing of displaying, on a display device, the image received from the imaging device; processing of receiving an operation input for changing at least one of an image-capture direction and magnification of the imaging device; processing of changing at least one of the image-capture direction and magnification of the imaging device according to the operation input; and processing of causing, during a period after the operation input up to completion of the change in the image-capture direction or magnification by the imaging device, the display device to display an image which is created from a part of the image captured by the imaging device, and which is an image of a structural outline corresponding to the image-capture direction or magnification according to the operation input.

Note that, in the present invention, terms such as "unit" or "means", "apparatus", "system" do not simply refer to physical means, and also include cases of realizing, via software, the functions of such "unit" or "means", "apparatus", "system". Moreover, the functions of one "unit" or "means", "apparatus", "system" may be realized by two or more physical means or devices, or the functions of two or more "units" or "means", "apparatuses", "systems" may be realized by one physical means or device.

According to the present invention, it is possible to provide an image processing system, an image processing method, and a program capable of improving the user-friendliness upon making the operation input for controlling the imaging device.

DETAILED DESCRIPTION

Figure 1:
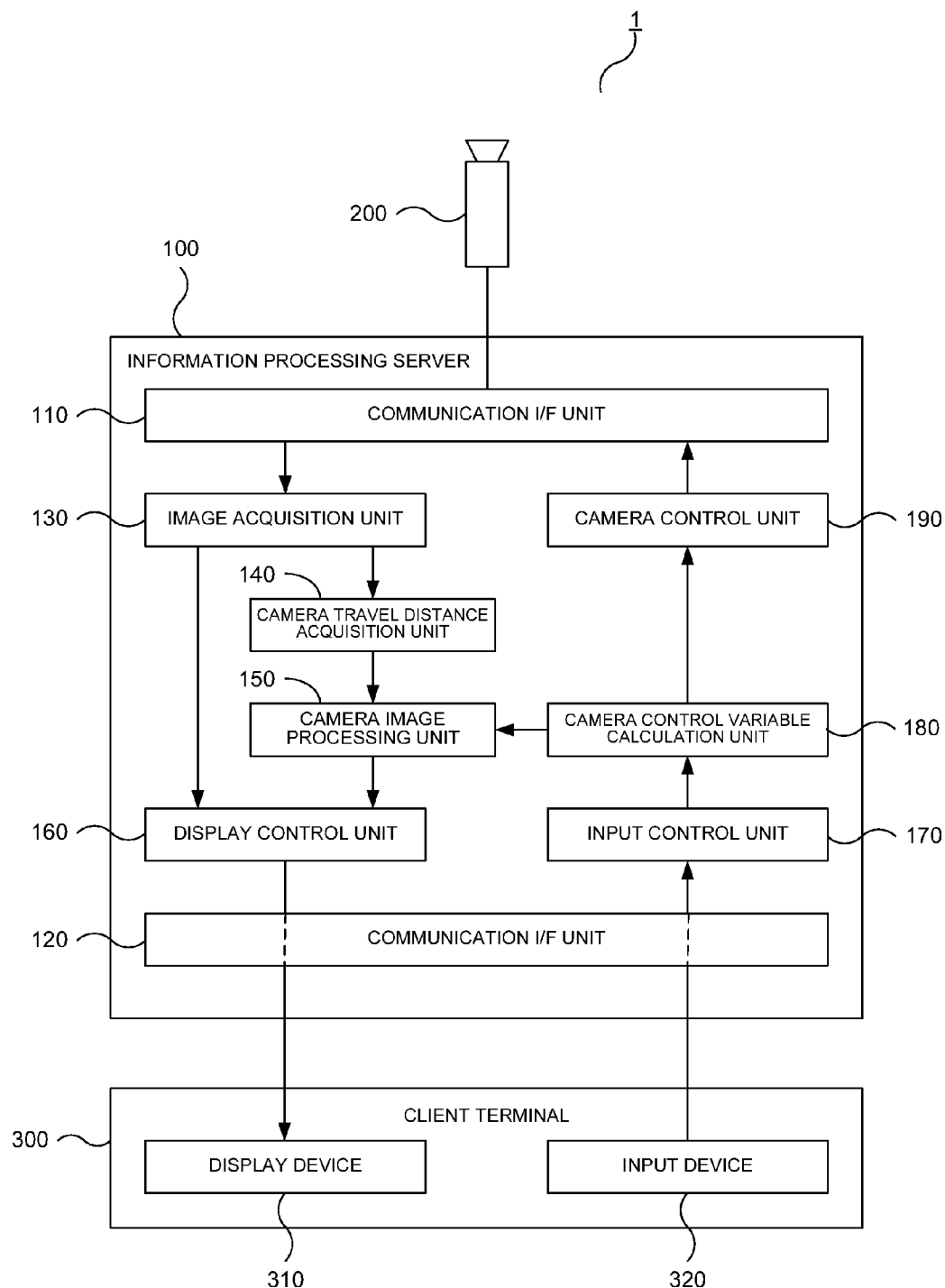
FIG. 1 is a functional block diagram showing a schematic configuration of the monitoring system according to the first embodiment.

Embodiments of the present invention are now explained. The same or similar configuration in the descriptions of the ensuing explanation and reference drawings is given the same or similar reference numeral.

(1 First Embodiment)

FIG. 1 to FIG. 6 are diagrams explaining the first embodiment. This embodiment is now explained in accordance with the following flow with reference to FIG. 1 to FIG. 6. Foremost, the outline of the overall first embodiment is shown by describing the functional configuration of the overall system in Section "1.1", and indicating specific examples of the display screen in Section "1.2". Subsequently, the flow of processing is described in Section "1.3", and specific examples of the hardware configuration are indicated in Section "1.4". Finally, the effect of this embodiment is explained in Section "1.5" onward.

(1.1 Functional Configuration)

The functional configuration of the monitoring system 1 according to this embodiment is now explained with reference to FIG. 1. FIG. 1 is a block diagram showing the schematic configuration of the monitoring system 1.

The monitoring system 1 is basically configured from an information processing server 100 as an image processing system, a video camera 200 for imaging a video image, and a client terminal 300.

With the monitoring system 1, the image imaged with the video camera 200 is displayed, via the information processing server 100, on the display device 310 of the client terminal 300 operated by the user. Moreover, in accordance with the operation signal input from the client terminal 300, the information processing server 100 sends (outputs) various control signals to the video camera 200 for performing a pan (rotation), a tilt (angle adjustment), a zoom (expansion/reduction) and the like.

Here, when an operation input for performing at least one operation among pan, tilt and zoom is sent from the client terminal 300, the information processing server 100 outputs, to the video camera 200, a control signal according to the operation input, and creates an image corresponding to the structural outline after the control in accordance with the operation input, even during the period up to the completion of control of the video camera 200, and causes the video camera 200 to display the created image. Consequently, since the user to make an operation input from the client terminal 300 for controlling the video camera 200 will be able to instantaneously confirm the structural outline after the completion of control, if the confirmed structural outline differs from the intended structural outline, the user can perform an operation once again to achieve an appropriate structural outline. In other words, it is possible to improve the user-friendliness upon making the operation input for controlling the video camera 200.

The video camera 200, the information processing server 100, and the client terminal 300 are now each explained below.

(1.1.1 Video Camera 200)

The video camera 200 is an imaging device (having a pan-tilt-zoom function (PTZ function)) capable of performing a pan (rotation), tilt (angle adjustment), zoom (expansion/reduction) and the like. In other words, the video camera 200 can change the image-capture direction and change the image-capture magnification. Note that it is not necessary to comprise all functions of the pan function, tilt function, and zoom function, and it is possible to comprise only a part of those functions.

The video camera 200 captures a video image and outputs the video image to the information processing server 100. Moreover, the video camera 200 changes the image-capture direction or the image-capture magnification based on a control signal that is input from the information processing server 100. Furthermore, here, since the video camera 200 changes the image-capture direction or changes the image-capture magnification based on mechanical control, a given amount of time is required until the operation (control) pertaining to the pan-tilt-zoom function is completed.

Note that, in this embodiment, while a case of using one video camera 200 is explained, the configuration is not limited thereto, and the monitoring system 1 may be configured by using a plurality of video cameras 200. As a result of using a plurality of video cameras 200, it is possible to create a more comprehensive monitoring network.

Moreover, in this embodiment, while the video camera 200 is explained as a separate device from the information processing server 100, the configuration is not limited thereto and, for example, the device configuring the information processing server 100 may have the video camera 200 built therein.

(1.1.2 Image Processing Server 100)

The information processing server 100 receives an input of the video image from the video camera 200, and causes the client terminal 300 to display the image captured by the video camera 200 by outputting the image to the client terminal 300. Moreover, the information processing server 100 receives, from the client terminal 300, an operation signal for operating the video camera 200, and outputs, to the video camera 200, a control signal for controlling the video camera 200.

The information processing server 100 includes communication I/F (interface) units 110 and 120, an image acquisition unit 130, a camera travel distance acquisition unit 140, a camera image processing unit 150, a display control unit 160, an input control unit 170, a camera control variable calculation unit 180, and a camera control unit 190.

The communication I/F unit 110 is an interface for the video camera 200 to communicate with the information processing server 100 and the communication I/F unit 120 is an interface for the client terminal 300 to communicate with the information processing server 100, respectively. Note that, in the example of FIG. 1, while separate configurations are indicated, for instance, the communication I/F units may be realized as a single interface capable of communicating with both the video camera 200 and the client terminal 300 via a local area network (LAN) or the like.

The image acquisition unit 130 acquires a captured video image (picture) from the video camera 200 via the communication I/F unit 110. The captured video image can be displayed on the display device 310 of the client terminal 300 based on the display control unit 160.

The camera travel distance acquisition unit 140 identifies how much the video camera 200 moved (how much the image-capture angle changed and the magnification changed) after the control signal for controlling the video camera 200 has been sent. The travel distance of the video camera 200 can be identified, for example, based on a control signal that is received from the video camera 200. Otherwise, the travel distance of the video camera 200 can also be identified by comparing the amount of change of the structural outline of the picture from the video camera 200 before the control signal is sent, and the structural outline of the picture that is occasionally received from the video camera 200.

The camera image processing unit 150 creates, based on a control variable acquired from the camera control variable calculation unit 180 and instructed to the video camera 200 and a travel distance of the video camera 200 up to that point in time acquired by the camera travel distance acquisition unit 140, an image according to the structural outline after the completion of travel (completion of control) of the video camera 200 from at least a part of the image captured by the video camera 200 up to that point in time. The image created by the camera image processing unit 150 is displayed on the display device 310 of the client terminal 300 by the display control unit 160.

Note that, in the foregoing explanation, while the image input from the video camera 200 is processed as needed by the camera image processing unit 150 and then displayed on the client terminal 300 according to the travel distance of the video camera 200 identified by the camera travel distance acquisition unit 140, the configuration is not limited thereto. For example, it is also possible to create, with the camera image processing unit 150, an image according to the structural outline (field of view) after the completion of travel upon sending a control signal to the video camera 200, and display that image (still image) on the display device 310 up to the completion of travel, and display the video image input once again from the video camera 200 on the display device 310 after the completion of travel. In the foregoing case, the camera travel distance acquisition unit 140 is not necessarily required.

As described above, the display control unit 160 sends (outputs), to the client terminal 300 via the communication I/F unit 120, the video image acquired (received) by the image acquisition unit 130 from the video camera 200, or the image output from the camera image processing unit 150. Here, before the control signal is sent to the video camera 200 and after the completion of control of the video camera 200, the display control unit 160 directly sends the video image input from the video camera 200 to the client terminal 300, and, during the period after the control signal is sent to the video camera 200 and up to the completion of control of the video camera 200, the image processed by the camera image processing unit 150 and which corresponds to the structural outline after the completion of control is sent to the client terminal 300.

The input control unit 170 receives (operation input), via the communication I/F unit 120, an operation signal for moving the video camera 200 (as described above, changing the angle and changing the magnification) that is input from the input device 320 of the client terminal 300, and outputs the received operation signal to the camera control variable calculation unit 180.

The camera control variable calculation unit 180 calculates the control variable (travel distance of moving the video camera 200) to be actually given to the video camera 200 based on the operation signal pertaining to the user operation which was acquired from the input control unit 170.

The camera control unit 190 converts the control variable calculated by the camera control variable calculation unit 180 into a control signal, and outputs (sends) the control signal to the video camera 200 via the communication I/F unit 110. Consequently, the control signal according to the operation signal input from the input device 320 of the client terminal 300 is output to the video camera 200.

Note that, in this embodiment, while the camera control variable calculation unit 180 of the information processing server 100 determines the control variable of the video camera 200, the configuration is not limited thereto. For example, the client terminal 300 may also calculate the control variable to be given to the video camera 200.

(1.1.3 Client Terminal 300)

The client terminal 300 is an information processing apparatus including a display device 310 and an input device 320. The client terminal 300 according to this embodiment is explained as a so-called smartphone or tablet-type information terminal comprising a touch panel including a display device 310 (display) and an input device 320 (touch pad). Nevertheless, the configuration is not necessarily limited to the above, and, so as long as the display device 310 and the input device 320 are provided, for instance, the client terminal 300 can be realized with a desktop or laptop personal computer.

Moreover, in this embodiment, while the information processing server 100 and the client terminal 300 are realized as separated devices, the configuration is not limited thereto. For example, the configuration may also be realized by the information processing server 100 comprising the display device 310 and the input device 320.

The client terminal 300, as described above, receives the image captured by the video camera 200 from the information processing server 100, and displays this image on the display device 310. Moreover, the client terminal 300 outputs (sends), to the information processing server 100, an operation signal based on the operation input by the user into the input device 320 while viewing the display device 310 so as to control the video camera 200.

The display device 310 is a display for displaying an image, for example, on a liquid crystal or organic electro luminescence (EL). The image sent from the display control unit 160 of the information processing server 100 via the communication I/F unit 120 is displayed on the display device 310.

The input device 320 is a device such as a touch pad or the like described above for the user to input operations. As described above, in this embodiment, while the input device 320 is explained as an input device of a tablet-type information terminal, the configuration is not limited thereto, and may also be realized with a pointing device such as a mouse, or a keyboard.

(1.2 Specific Example of Display Screen)

Figure 2:
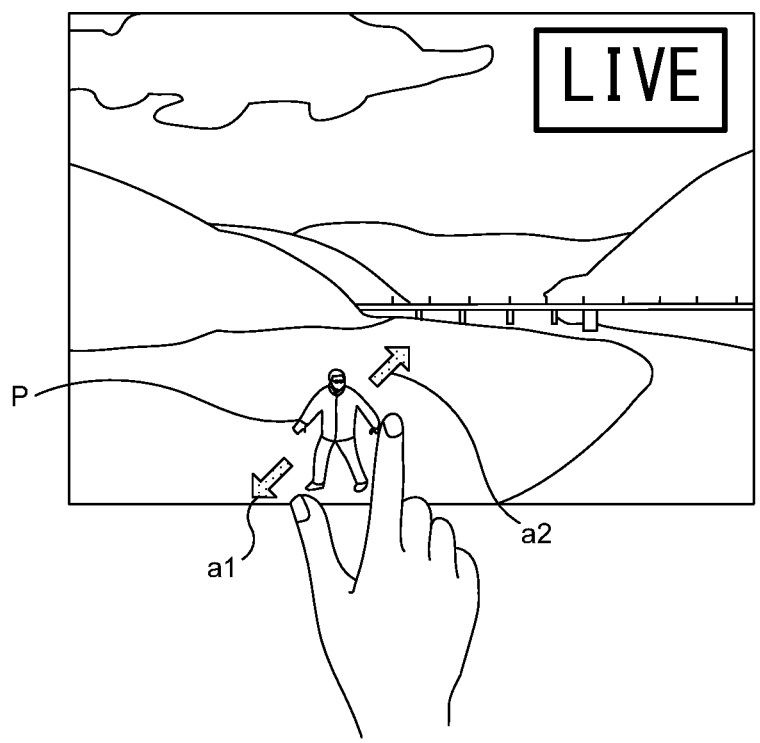
FIG. 2 is a diagram showing a specific example of the display screen.
Figure 3:
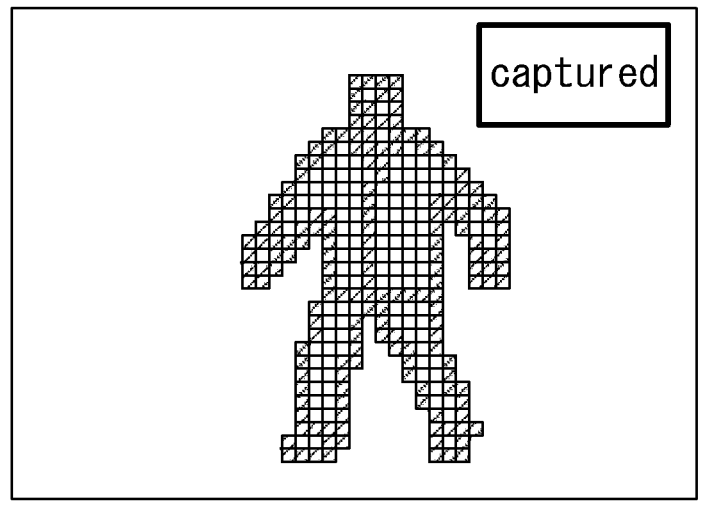
FIG. 3 is a diagram showing a specific example of the display screen.
Figure 4:
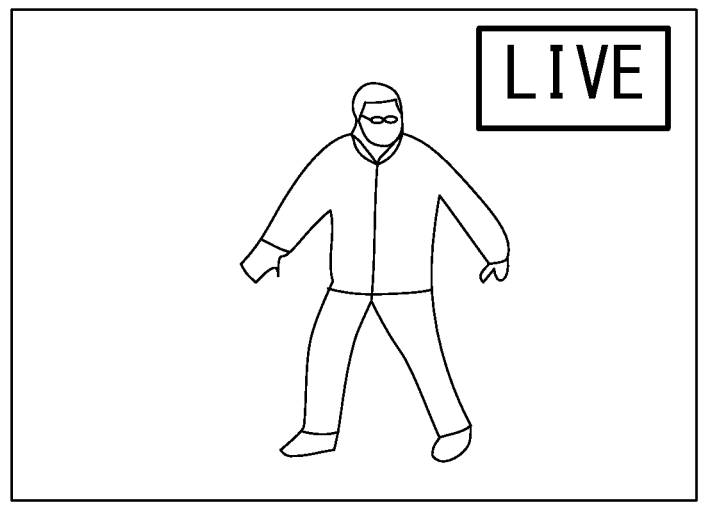
FIG. 4 is a diagram showing a specific example of the display screen.

Specific examples of the display screen to be displayed on the display device 310 are now explained with reference to FIG. 2 to FIG. 4. FIG. 2 to FIG. 4 are diagrams showing specific examples of the display screen to be displayed on the display screen of the display device 310.

In the example of the display screen of FIG. 2, shown is a diagram in a case of the display device 310 displaying a real-time picture (video image) that was input from the video camera 200 via the information processing server 100. Note that, in the example of FIG. 2, in order to clearly indicate to the user that the image is real time, the display device 310 indicates the letters "LIVE" at the upper right part of the display screen.

In addition, FIG. 2 shows that the user is using one's fingers to input a pinch-out operation (operation of simultaneously tracing, with one's fingers, the touch panel in the directions of arrows a1 and a2) around the person P displayed in the picture. This pinch-out operation expands the image-capture range around the area to be operated; that is, this is an operation for causing the video camera 200 to perform the zoom function of expanding the area to which the pinch-out operation was performed.

Note that, while not shown in this example, the pinch-in operation of moving one's fingers in the opposite direction to the pinch-out operation can be thought of as an operation input for causing the video camera 200 to perform the zoom operation of reducing the image around the area to be operated by the user, and the slide operation and the touch operation can be thought of as an operation input for causing the video camera 200 to perform the pan operation or the tilt operation for changing the image-capture direction according to the designated direction, length or position. However, the operation inputs described above are merely examples, and various associations of the operation input and the control to the video camera 200 may be considered.

FIG. 3 shows an example of the display screen to be displayed on the display device 310 immediately after the user performs the pinch-out operation. The display screen of FIG. 3 can be generated by simply expanding the area to which the pinch-out operation was performed from the image of the display screen shown in FIG. 2. Since the image of the display screen according to FIG. 3 is obtained by simply expanding the image of the display screen shown in FIG. 2, the resolution is lower than an image that is normally captured by the video camera 200. Note that, since the image shown in FIG. 3 is not a real-time image, in order to clearly indicate this to the user, the display device 310 indicates the letters "captured" at the upper right part of the display screen.

To summarize the flow of processing shown in FIG. 2 and FIG. 3, when the user makes an operation input for controlling the video camera 200, the camera image processing unit 150 of the information processing server 100 creates, based on the foregoing operation, an image corresponding to the structural outline (field of view) after the completion of control from at least a part of the image captured by the video camera 200, and the display control unit 160 causes the display device 310 to display that image.

Consequently, since the user can instantaneously confirm that type of structural outline that will result after the completion of control, even before the control of the video camera 200 is completed, the user can take appropriate action such as making another operation input. In other words, the user's user-friendliness is improved.

Subsequently, when the control of the video camera 200 (zoom operation according to the user operation) is completed, the display control unit 160 causes the display device 310 to display a real-time video image that is input from the video camera 200 as shown in FIG. 4.

(1.3 Flow of Processing)

Figure 5:
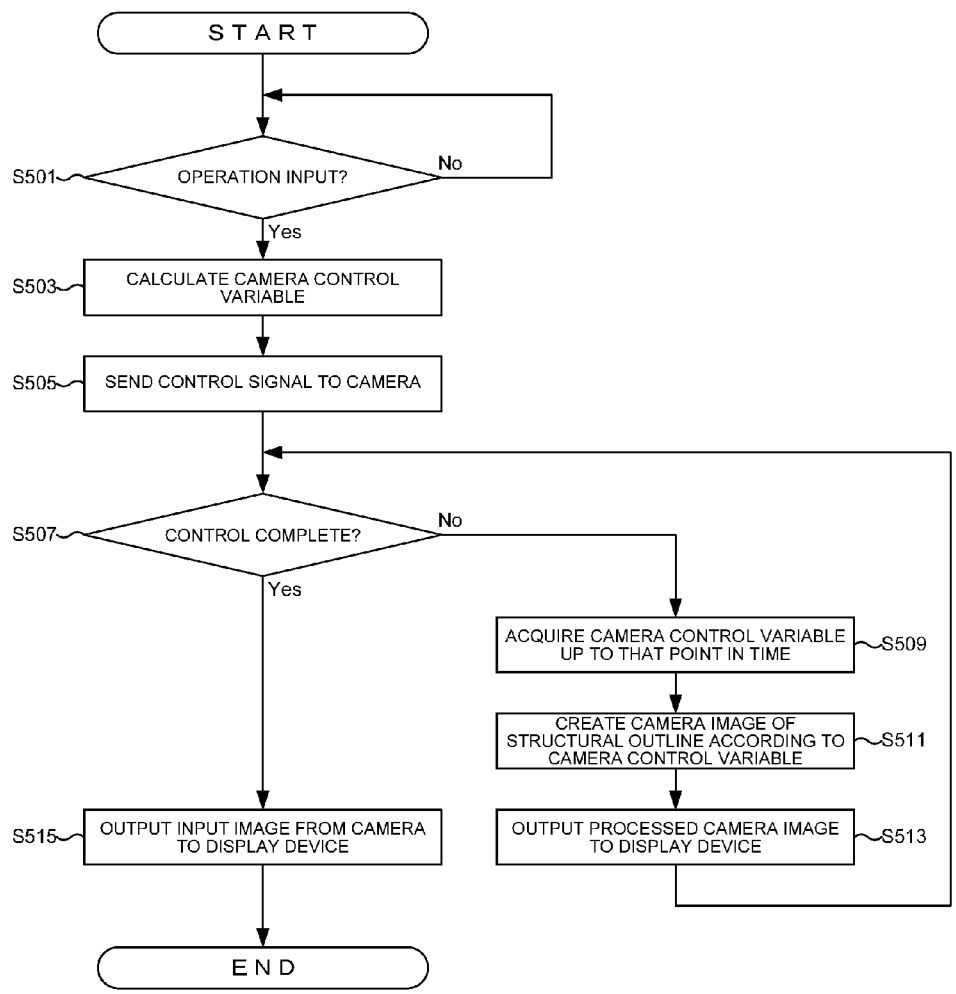
FIG. 5 is a flowchart showing the flow of processing of the information processing server illustrated in FIG. 1.

The flow of processing of the information processing server 100 is now explained with reference to FIG. 5. FIG. 5 is a flowchart showing the flow of processing of the information processing server 100 according to this embodiment.

Note that each of the processing steps described later can be executed by arbitrarily changing the order or in parallel to the extent that no inconsistency will arise in the processing contents. Moreover, another step may be added between the respective processing steps. In addition, a step that is indicated as one step for the sake of convenience may be executed by being separated into a plurality of steps, and a step that is indicated by being separated into a plurality of steps for the sake of convenience may be executed as a single step.

Foremost, the input control unit 170 of the information processing server 100 determines whether an operation signal pertaining to a user operation was input from the input device 320 of the client terminal 300 (S501). If an operation input was input from a user (S501; Yes), in accordance with the operation signal received from the input device 320, the camera control variable calculation unit 180 calculates a control variable of the video camera 200 according to the user operation (S503). The camera control unit 190 generates a control signal according to the control variable calculated by the camera control variable calculation unit 180, and sends the control signal to the video camera 200 (S505). Consequently, the video camera 200 starts the pan operation, tilt operation, zoom operation and the like according to the user operation.

Subsequently, the camera image processing unit 150 determines whether the control of the video camera 200 is completed (S507). Note that the determination of whether the control of the video camera 200 is complete may be made by acquiring the status information from the video camera 200, or by determining whether the change in the picture corresponding to the control variable received from the camera control variable calculation unit 180 has occurred in the video image that was input from the video camera 200.

In S507, when the control of the video camera 200 is not complete (S507; Yes), the camera travel distance acquisition unit 140 acquires the camera travel distance (operating quantity) up to that point in time. While various methods may be considered for acquiring the camera travel distance, for instance, as described above, the camera travel distance can be acquired from the video camera 200, or the camera travel distance can be determined depending on to what extent the image input from the video camera 200 has changed.

The camera image processing unit 150 generates an image according to the structural outline after the completion of control of the video camera 200 by comparing the camera travel distance acquired in S509 and the camera control variable calculated in S503 (S511). The display control unit 160 causes the display device 310 of the client terminal 300 to display the image (illustrated in FIG. 3) according to the structural outline after the completion of control of the video camera 200 that was generated by the camera image processing unit 150 (S513). The processing of S509 to S513 is repeated until the control of the video camera 200 is completed.

If the control of the video camera 200 according to the user operation is completed (S507; Yes), the display control unit 160 causes the display device 310 of the client terminal 300 to display the real-time video image received from the video camera 200 without changing the resolution or the like (S515; illustrated in FIG. 4).

Note that, in the foregoing explanation, while the processing of S509 to S513 is repeated until the control of the video camera 200 is completed, without limitation thereto, it is also possible to generate a camera image processed by the camera image processing unit 150, only once, corresponding to the point in time that the user operation was input. In the foregoing case, the processing of S509 does not necessarily have to be performed.

(1.4 Specific Example of Hardware Configuration)

An example of the hardware configuration of the information processing server 100 described above is now explained with reference to FIG. 6. Note that, as described above, the functions of the information processing server 100 can also be realized by a plurality of information processing apparatuses (for instance, by a server and a client).

Figure 6:
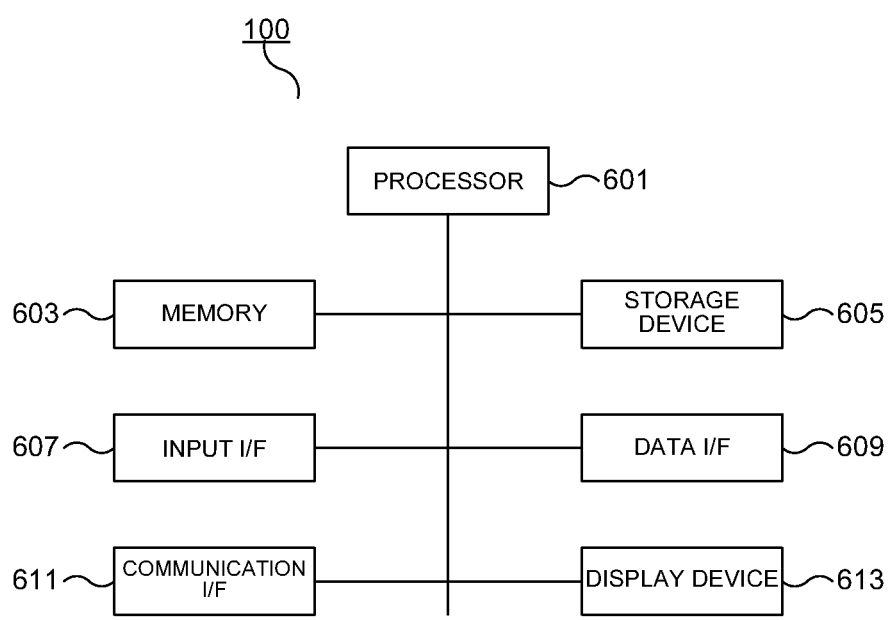
FIG. 6 is a block diagram showing a functional configuration of the hardware configuration capable of implementing the information processing server illustrated in FIG. 1.

As shown in FIG. 6, the information processing server 100 includes a processor 601, a memory 603, a storage device 605, an input I/F 607, a data I/F 609, a communication I/F 611, and a display device 613.

The processor 601 controls the various types of processing to be performed by the information processing server 100 by executing the programs stored in the memory 603. For example, the processing pertaining to the image acquisition unit 130, the camera travel distance acquisition unit 140, the camera image processing unit 150, the display control unit 160, the input control unit 170, the camera control variable calculation unit 180, and the camera control unit 190 explained in FIG. 1 can be realized as programs that mainly run on the processor 601 upon being stored in the memory 603.

The memory 603 is a storage medium such as a random access memory (RAM). The memory 603 temporarily stores program codes of the programs to be executed by the processor 601, and data that is required upon executing the programs. For example, a stack area that is required upon executing the programs is reserved in the storage area of the memory 603.

The storage device 605 includes, for instance, a non-volatile storage medium such as a hard disk or a flash memory. The storage device 605 stores, for instance, an operating system, various programs for realizing the image acquisition unit 130, the camera travel distance acquisition unit 140, the camera image processing unit 150, the display control unit 160, the input control unit 170, the camera control variable calculation unit 180, and the camera control unit 190, and other various types of data which are required. The programs and data stored in the storage device 605 are referred to by the processor 601 by being loaded into the memory 603 as needed.

The input I/F 607 is a device for receiving inputs from the user. The input device 320 explained with reference to FIG. 1 can also be realized as an input I/F built into the information processing server 100 without having to comprise the client terminal 300 as explained with reference to FIG. 1. The input I/F 607 may also be connected to the information processing server 100 via an interface such as a universal serial bus (USB).

The data I/F 609 is a device for inputting data from the outside of the information processing server 100. As a specific example of the data I/F 609, there is a drive device for reading data stored in various storage mediums. The data I/F 609 may also be provided outside the information processing server 100. In the foregoing case, the data I/F 609 is connected to the information processing server 100 via an interface such as a USB.

The communication I/F 611 is a device for performing data communication, via wire or wireless, with an external device of the information processing server 100 such as a video camera 200 or a client terminal 300. The communication I/F unit 110 or the communication I/F unit 120 shown in FIG. 1 corresponds to the communication I/F 611. Note that the communication I/F 611 may also be provided outside the information processing server 100. In the foregoing case, the communication I/F 611 is connected to the information processing server 100 via an interface such as a USB.

The display device 613 is a device for displaying various types of information and is, for example, a liquid crystal display or an organic electro-luminescence (EL) display. The display device 310 explained with reference to FIG. 1 can also be realized as a display device 613 built into the information processing server 100 without having to comprise the client terminal 300 as explained with reference to FIG. 1. Moreover, the display device 613 may also be connected to the outside of the information processing server 100 via a display cable or the like.

(1.6 Effect of this Embodiment)

As explained above, when the information processing server 100 according to this embodiment receives an operation input for changing the image-capture direction or magnification of the imaging device while a video image captured by the video camera 200 is being displayed on the display device 310, the information processing server 100 creates an image, as shown in FIG. 2, corresponding to a field of view (structural outline) after completion of control according to the operation, and displays the created image on the display device 310. It is thereby possible to improve the user-friendliness because the user can instantaneously confirm the ultimate field of view even before the operation of the video camera 200 is completed.

(2 Second Embodiment)

Figure 7:
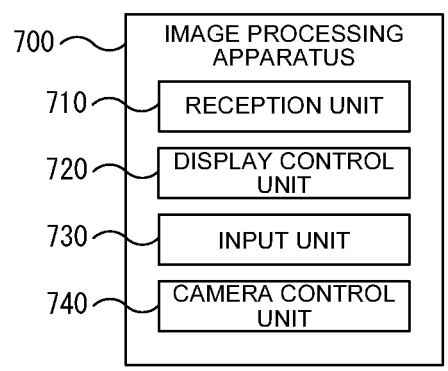
FIG. 7 is a functional block diagram showing a schematic configuration of the image processing apparatus according to the second embodiment.

The second embodiment is now explained with reference to FIG. 7. FIG. 7 is a block diagram showing the functional configuration of the image processing apparatus 700 as an image processing system. As shown in FIG. 7, the image processing apparatus 700 includes a reception unit 710, a display control unit 720, an input unit 730, and a camera control unit 740.

The reception unit 710 receives an image captured by an imaging device (camera) not shown. The display control unit 720 displays the image received by the reception unit 710 on a display device not shown. The input unit 730 receives an operation input for changing at least either the image-capture direction or magnification of the foregoing imaging device. The camera control unit 740 changes at least either the image-capture direction or magnification of the imaging device according to the operation input that is input from the input unit 730.

In addition, during the period after receiving the operation input with the input unit 730 up to the completion of change of the image-capture direction or magnification of the imaging device, the display control unit 720 causes the display unit to display an image of a structural outline corresponding to the image-capture direction or magnification according to the operation input which is created from a part of the image captured by the imaging device.

Based on the foregoing implementation, the image processing apparatus 700 according to this embodiment can improve the user-friendliness upon making an operation input for controlling the imaging device.

3 Supplementary Information

Note that the configuration of the foregoing embodiments may be combined or a partial configuration may be substituted. Moreover, the configuration of the present invention is not limited to the foregoing embodiments, and may be variously modified to the extent that the modification does not deviate from the gist of the present invention.

Note that a part or all of the respective embodiments described above may be as described in the following Notes, but are not limited thereto. Moreover, the program of the present invention will suffice so as long as it is a program capable of causing a computer to execute the respective operations explained in each of the foregoing embodiments.

(Supplementary Note 1)

An image processing system comprising: reception means for receiving an image captured by an imaging device; display control means for displaying, on a display device, the image received from the imaging device; input means for receiving an operation input for changing at least one of an image-capture direction and magnification of the imaging device; and camera control means for changing at least one of the image-capture direction and magnification of the imaging device according to the operation input, wherein, during a period after the operation input up to completion of the change in the image-capture direction or magnification by the imaging device, the display control means causes the display device to display an image which is created from a part of the image captured by the imaging device, and which is an image of a structural outline corresponding to the image-capture direction or magnification according to the operation input.

(Supplementary Note 2)

The image processing system according to Supplementary note 1 above, wherein, according to status information that is received during a period after the operation input up to completion of the change in the image-capture direction or magnification by the imaging device, the display control means generates an image of a structural outline corresponding to the image-capture direction or magnification according to the operation input.

(Supplementary Note 3)

The image processing system according to Supplementary note 2 above, wherein the image of the structural outline corresponding to the image-capture direction or magnification according to the operation input is a video image.

(Supplementary Note 4)

The image processing system according to Supplementary note 1 or Supplementary note 2 above, wherein, during a period after the operation input up to completion of the change in the image-capture direction or magnification by the imaging device, the display control means causes the display device to display an image created from a part of the image captured by the imaging device upon the operation input.

(Supplementary Note 5)

The image processing system according to any one of Supplementary notes 1 to 4 above, wherein, after completion of the change in the image-capture direction or magnification by the imaging device, the display control means causes the display device to display a real-time image captured by the imaging device.

(Supplementary Note 6)

The image processing system according to any one of Supplementary notes 1 to 5 above, wherein the input means receives, as the operation input, a pinch-in or pinch-out operation to an operational panel.

(Supplementary Note 7)

An image processing method in which an image processing system performs the steps of: receiving an image captured by an imaging device; displaying, on a display device, the image received from the imaging device; receiving an operation input for changing at least one of an image-capture direction and magnification of the imaging device; changing at least one of the image-capture direction and magnification of the imaging device according to the operation input; and causing, during a period after the operation input up to completion of the change in the image-capture direction or magnification by the imaging device, the display device to display an image which is created from a part of the image captured by the imaging device, and which is an image of a structural outline corresponding to the image-capture direction or magnification according to the operation input.

(Supplementary Note 8)

The image processing method according to Supplementary note 7 above, wherein, according to status information that is received during a period after the operation input up to completion of the change in the image-capture direction or magnification by the imaging device, the image processing system generates an image of a structural outline corresponding to the image-capture direction or magnification according to the operation input.

(Supplementary Note 9)

The image processing method according to Supplementary note 8 above, wherein the image of the structural outline corresponding to the image-capture direction or magnification according to the operation input is a video image.

(Supplementary Note 10)

The image processing method according to Supplementary note 7 or Supplementary note 8 above, wherein, during a period after the operation input up to completion of the change in the image-capture direction or magnification by the imaging device, the image processing device causes the display device to display an image created from a part of the image captured by the imaging device upon the operation input.

(Supplementary Note 11)

The image processing method according to any one of Supplementary notes 7 to 10 above, wherein, after completion of the change in the image-capture direction or magnification by the imaging device, the image processing device causes the display device to display a real-time image captured by the imaging device.

(Supplementary Note 12)

The image processing method according to any one of Supplementary notes 7 to 11 above, wherein the image processing device receives, as the operation input, a pinch-in or pinch-out operation to an operational panel.

(Supplementary Note 13)

A program for causing a computer to perform: processing of receiving an image captured by an imaging device; processing of displaying, on a display device, the image received from the imaging device; processing of receiving an operation input for changing at least one of an image-capture direction and magnification of the imaging device; processing of changing at least one of the image-capture direction and magnification of the imaging device according to the operation input; and processing of causing, during a period after the operation input up to completion of the change in the image-capture direction or magnification by the imaging device, the display device to display an image which is created from a part of the image captured by the imaging device, and which is an image of a structural outline corresponding to the image-capture direction or magnification according to the operation input.

(Supplementary Note 14)

The program according to Supplementary note 13 above, wherein, according to status information that is received during a period after the operation input up to completion of the change in the image-capture direction or magnification by the imaging device, the program causes the computer to generate an image of a structural outline corresponding to the image-capture direction or magnification according to the operation input.

(Supplementary Note 15)

The program according to Supplementary note 14 above, wherein the image of the structural outline corresponding to the image-capture direction or magnification according to the operation input is a video image.

(Supplementary Note 16)

The program according to Supplementary note 13 or Supplementary note 14 above, wherein, during a period after the operation input up to completion of the change in the image-capture direction or magnification by the imaging device, the program causes the computer to cause the display device to display an image created from a part of the image captured by the imaging device upon the operation input.

(Supplementary Note 17)

The program according to any one of Supplementary notes 13 to 16 above, wherein, after completion of the change in the image-capture direction or magnification by the imaging device, the program causes a computer to cause the display device to display a real-time image captured by the imaging device.

(Supplementary Note 18)

The image processing system according to any one of Supplementary notes 13 to 17 above, wherein the program causes a computer to receive, as the operation input, a pinch-in or pinch-out operation to an operational panel.

This application relates to and claims priority from Japanese Patent Application No. 2012-180230, filed on Aug. 15, 2012, the entire disclosure of which is incorporated herein by reference.

I claim:

1. An image processing system, comprising:
   a memory storing instructions; and
   one or more processors configured by the instructions to:
   receive an image captured by an imaging device;
   display the captured image with a pixel size of a display device;
   receive an operation input on a touch panel from a user for changing an image-capture direction and magnification of the imaging device; and
   change the image-capture direction and magnification of the imaging device in accordance with the operation input,
   wherein, during a period after the operation input up to completion of the change in the image-capture direction and magnification by the imaging device, the processors are configured by the instructions to cause the display device to display an image which is created from a part of the image captured by the imaging device,
   wherein structural outline of the created image meets the image-capture direction and magnification directed by the operation input,
   wherein the created image is displayed with the same or a lower resolution than the captured image and with the pixel size of the display size in accordance with the magnification, and
   wherein the resolution is determined by a pinch-out operation on the touch panel.

2. The image processing system of claim 1,
   wherein, according to status information that is received during a period after the operation input up to completion of the change in the image-capture direction and magnification by the imaging device, the processors are configured by the instructions to generate an image of a structural outline corresponding to the image-capture direction and magnification according to the operation input.

3. The image processing system of claim 2,
   wherein the image of the structural outline corresponding to the image-capture direction and magnification according to the operation input is a video image.

4. The image processing system of claim 1,
   wherein, during a period after the operation input up to completion of the change in the image-capture direction and magnification by the imaging device, the processors are configured by the instructions to cause the display device to display an image created from a part of the image captured by the imaging device upon the operation input.

5. The image processing system of claim 1,
   wherein, after completion of the change in the image-capture direction and magnification by the imaging device, the processors are configured by the instructions to cause the display device to display a real-time image captured by the imaging device.

6. The image processing system of claim 1,
   wherein the processors are configured by the instructions to receive, as the operation input, a pinch-in or pinch-out operation to an operational panel.

7. An image processing method in which an image processing system performs the steps of:
   receiving an image captured by an imaging device;
   displaying the captured image with a pixel size of the display device;
   receiving an operation input on a touch panel for changing an image-capture direction and
   magnification of the imaging device;
   changing the image-capture direction and magnification of the imaging device in accordance with the operation input;
   causing, during a period after the operation input up to completion of the change in the image-capture direction and magnification by the imaging device, the display device to display an image which is created from a part of the image captured by the imaging device, wherein a structural outline of the created image meets the image-capture direction and magnification directed by the operation input,
   wherein the created image is displayed with the same or a lower resolution than the captured image and with the pixel size of the display size in accordance with the magnification, and
   wherein the resolution is determined by a pinch-out operation on the touch panel.

8. A non-transitory computer-readable medium storing a program for causing a computer to perform:
   processing of receiving an image captured by an imaging device;
   processing of displaying the captured image with a pixel size of a display device;
   processing of receiving an operation input on a touch panel for changing an image-capture direction and magnification of the imaging device;
   processing of changing the image-capture direction and magnification of the imaging device in accordance with the operation input;
   processing of causing, during a period after the operation input up to completion of the change in the image-capture direction and magnification by the imaging device, the display device to display an image which is created from a part of the image captured by the imaging device, wherein a structural outline of the created image meets the image-capture direction and magnification directed by the operation input,
   wherein the created image is displayed with the same or a lower resolution than the captured image and with the pixel size of the display size in accordance with the magnification, and
   wherein the resolution is determined by a pinch-out operation on the touch panel.

* * * * *